United States Patent Office 3,379,481
Patented Apr. 23, 1968

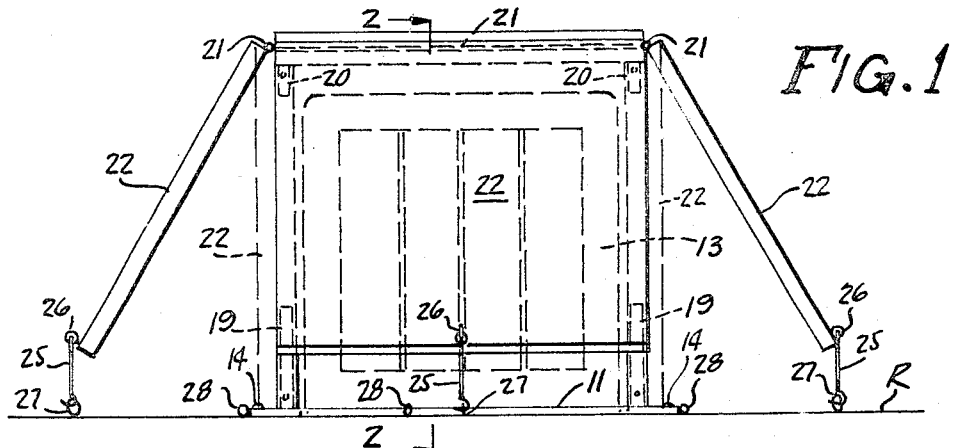
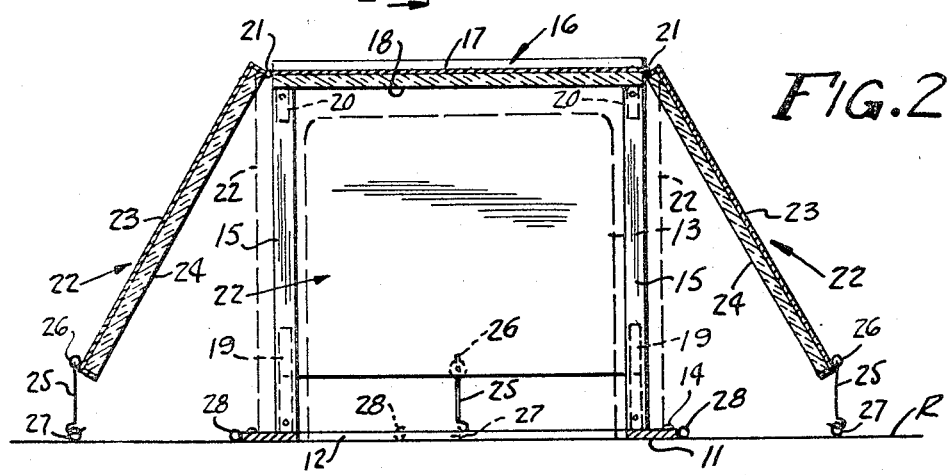
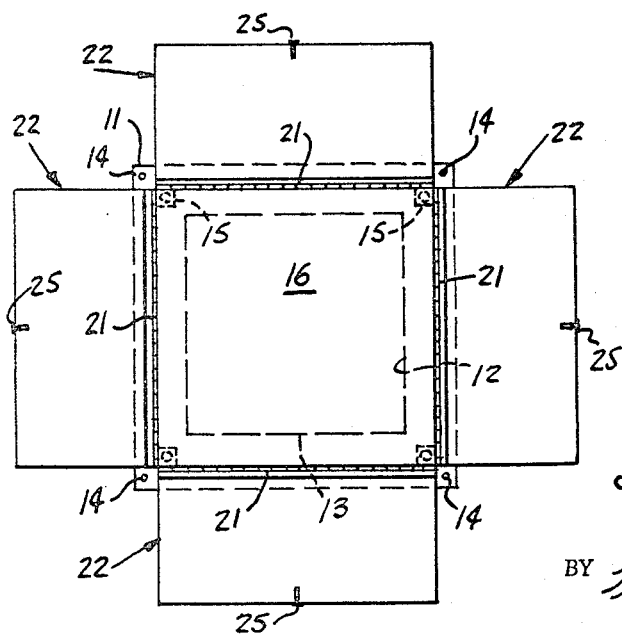

3,379,481
COVER FOR EXTERNAL AIR CONDITIONING APPARATUS
Jessie M. Fisher, 4724 Madison Ave., Space 63, Sacramento, Calif. 95841
Filed Oct. 20, 1965, Ser. No. 498,247
3 Claims. (Cl. 312—100)

ABSTRACT OF THE DISCLOSURE

An adjustable cover for air conditioning units which includes a rectangular base having corner studs protruding upwardly therefrom, corner posts received over the studs, a rectangular cover supported by downwardly extending studs received in the top of said posts, doors hingably secured to the sides of the cover and extending downwardly, hook and eye means for securing the covers outwardly away from the sides of the refrigeration unit or selectively adjacent the sides of the refrigeration unit for permitting or excluding air in the vicinity of the refrigeration unit is disclosed.

---

This invention relates to a cover for externally positioned air conditioning apparatus, such, for example, as a cooler or small air conditioning unit adapted to be mounted on the roof of a house trailer or the like.

A primary object of this invention is the provision of a device of this nature primarily intended to protect the cooling apparatus from the direct rays of the sun, while at the same time providing ample space for the ingress of ambient air into the cooling unit.

An additional object of the invention is the provision of a device of this character, which, when the unit is not in use, may be securely fastened about the cooling unit so as to protect it from inclement weather or the like.

A further object of the invention is the provision of a device of this nature which may be readily adapted to accommodate various sizes and types of cooling units.

Still another object of the invention is the provision of such device which may be installed with a minimum of time, effort and difficulty.

A still further object of the invention is a device of this nature which is sturdy and durable in construction, reliable and effective in operation, and simple and inexpensive to utilize, manufacture and install.

In brief summary, the present invention comprises a rectangular base which is provided with studs to support upright posts and a cover supported by downwardly extending studs on the upright posts. The posts may be cut to any desired length thus permitting adjustment of the height of the cover. Hinged door coverings are provided for selectively opening or closing the refrigeration unit to selectively permit or exclude air in the vicinity of the refrigeration unit.

Still other objects reside in the combinations of elements, arrangements of parts, and features of construction, all as will be more fully detailed hereinafter, and shown in the accompanying drawing wherein there is disclosed a preferred embodiment of this inventive concept.

In the drawing:

FIGURE 1 is a side elevational view of one form of device constructed in accordance with the invention shown in open position in association with an air conditioning or cooling unit mounted exteriorly, as for example, on the roof of a vehicle, building, or the like;

FIGURE 2 is a sectional view taken substantially on line 2—2 of FIGURE 1 as viewed in the direction indicated by the arrows; and FIGURE 3 is a top plan view of the device on a slightly reduced scale.

Similar reference characters refer to similar parts throughout the several views of the drawing.

Having reference now to the drawing in detail, the device of the instant invention is generally indicated at 10 and comprises a generally rectangular base 11 having a relatively large rectangular central opening therein which is adapted to be positioned over a roof-type air conditioning unit or cooler 13 of any desired conventional configuration. The base may be secured as by means of bolts or screws 14 to the roof or surface R. Extending upwardly from each corner of the base is an upright 15, the four uprights supporting a top or cover generally indicated at 16, and including a metal outer layer or sheet 17 and inner layer 18 of any suitable insulating material. Supporting posts 15 may be removably mounted on studs 19 and 20 extending upwardly and downwardly, respectively, from the base 11 and the cover 16, so that they may be interchangeably varied in accordance with the relative height of the air conditioner or cooler.

Secured along the entire length of each edge of cover 16 as by means of piano-type hinge 21 is a hinged side wall member 22 comprised of an outer sheet 23 of metal and an inner sheet 24 of insulating material. Adjacent the lower edge of each side wall at an intermediate point is a swingable hook 25 of substantial length, the hook being swingably mounted in an eye 26 secured to the inside of the adjacent side wall. The free end of each hook 25 may selectively engage a first eye 27 which is spaced a substantial distance from the edge of the base 11, so that each side wall is supported in suspended relation to the cover at an obtuse angle, so that air may circulate beneath the elevated side walls in the direction indicated by the arrows in FIGURE 1 and also therebetween at the corners in the direction indicated by the arrows in FIGURE 3. By virtue of this arrangement, the air conditioning unit is substantially protected from the direct rays of the sun and insulated therefrom while at the same time an adequate supply of air is permitted to circulate into the air cooling or conditioning device.

When it is desired, during inclement weather or during cold weather when the device is not in use, to completely enclose the air conditioning unit to protect the same, the hooks 25 are disengaged from the eyes 27 permitting the walls to drop in closed relation relative to the sides of the device, and resecured to offset eyes 28, mounted on the base 11, the spacing of the eye 28 being such that the full extent of the hook across the side wall is necessary to engage the eyes 28, so that with the hooks in this position the side walls are firmly secured in closed position, completely and effectively protecting the air conditioning unit.

From the foregoing it will now be seen that there is herein provided a device which accomplishes all of the objects of this invention, and others, including many advantages of great practical utility and commercial importance.

As many embodiments may be made of this inventive concept and as many modifications may be made in the embodiment hereinbefore shown and described, it is to be understood that all matter herein is to be interpreted merely as illustrative and not in a limiting sense.

I claim:

1. In a device of the character described in combination, a generally rectangular base having a relatively large opening therein adapted to seat over an exteriorly mounted air conditioning device, an upwardly extending stud at each corner of the base, a corner post extending upwardly from each corner of said base, said corner posts being received on said upwardly extending studs, a rectangular cover supported by downwardly extending studs received in said corner posts, a layer of insulation on the underside of said cover, a side wall hingedly mounted on each side of said cover of a height to extend in closed poistion completely to said base, and a layer of insulation secured to the inner side of each side wall, and means securing said side walls in semi-open position, inclined at an acute angle relative to said cover adapted to permit passage of air beneath and around said side walls to said air conditioner.

2. The structure of clim 1 wherein the means securing said side walls in semi-open position comprises elongated hooks pivotally secured to an intermediate point on the free edge of each side wall, and eyes engageable by said hooks, said eyes being adapted to be mounted in the surface supporting said base at a distance spaced from the edges of said base.

3. The structure of claim 2 wherein additional eyes are secured to said base in offset relation relative to the mounting of said hooks, whereby when said hooks engage said last-mentioned eyes, said side walls are held in fully closed position.

References Cited

UNITED STATES PATENTS

| 2,374,426 | 4/1945 | Diederich | 292—101 X |
| 3,006,498 | 10/1961 | Thiede et al. | 312—100 X |
| 2,806,755 | 9/1957 | Glass | 312—257 |

FOREIGN PATENTS

| 1,150,069 | 1/1958 | France. |

BOBBY R. GAY, *Primary Examiner.*

DAVID J. WILLIAMOWSKY, *Examiner.*

J. L. KOHNEN, *Assistant Examiner.*